(12) United States Patent
Partington

(10) Patent No.: US 7,775,703 B2
(45) Date of Patent: Aug. 17, 2010

(54) STIRRING APPARATUS AND METHOD OF USE OF SAID APPARATUS

(75) Inventor: Stephen Roy Partington, East Yorkshire (GB)

(73) Assignee: Ineos Europe Limited, Hampshire (GB)

( * ) Notice: Subject to any disclaimer, the term of this patent is extended or adjusted under 35 U.S.C. 154(b) by 1057 days.

(21) Appl. No.: 10/547,846

(22) PCT Filed: Feb. 27, 2004

(86) PCT No.: PCT/GB2004/000753

§ 371 (c)(1),
(2), (4) Date: Jul. 25, 2006

(87) PCT Pub. No.: WO2004/078330

PCT Pub. Date: Sep. 16, 2004

(65) Prior Publication Data

US 2007/0002683 A1    Jan. 4, 2007

(30) Foreign Application Priority Data

Mar. 5, 2003  (GB) ................................. 0305023.4

(51) Int. Cl.
*B01F 7/24*   (2006.01)

(52) U.S. Cl. .................. 366/133; 366/266; 366/318
(58) Field of Classification Search ................. 366/133, 366/192, 196, 266, 318
See application file for complete search history.

(56) References Cited

U.S. PATENT DOCUMENTS

| 626,108 A | * | 5/1899 | Stuckel ...................... 198/675 |
| 2,718,384 A | | 9/1955 | Schroeder |
| 2004/0257903 A1 | * | 12/2004 | Ueda et al. .................... 366/77 |

FOREIGN PATENT DOCUMENTS

| FR | 2 083 160 | 12/1971 |
| GB | 1 321 709 | 6/1973 |
| GB | 1 325 090 | 8/1973 |

* cited by examiner

*Primary Examiner*—David L Sorkin
(74) *Attorney, Agent, or Firm*—Nixon & Vanderhye

(57) ABSTRACT

The present invention provides an apparatus comprising a vessel having a conduit extending therefrom, and a stirrer, a section of which is adapted to be located within the conduit and a section of which is adapted to be located within the vessel, said stirrer being adapted such that, in use, material within the conduit is conveyed in a direction towards the vessel and/or in a direction away from the vessel.

2 Claims, 2 Drawing Sheets

STIRRING APPARATUS AND METHOD OF USE OF SAID APPARATUS

This application is the U.S. National Phase of International Application PCT/GB04/000753, filed 27 Feb. 2004, which designated the U.S. PCT/GB04/000753 claims priority to British Application No. 0305023.4 filed 5 Mar. 2003. The entire content of these applications are incorporated herein by reference.

BACKGROUND OF THE INVENTION

This invention relates to a stirring apparatus and its method of use.

Processes are known in which materials are stirred within a vessel. In particular, numerous chemical processes, such as chemical reactions, involve stirring of reactants together to produce products, which are discharged from the vessel (reactor). For solids, liquids, slurries etc, discharge of material from the vessel may be achieved by allowing the material to flow through a suitable conduit. Where it is desired for the vessel to be completely emptied of material as effectively as possible, the conduit is preferably located at the lowest point (base) of the vessel.

To prevent material from flowing from the vessel when not required the conduit will normally comprise a valve or other sealing means. However, it is often not possible or desirable for the valve to be located on the conduit at a position close to the vessel. For example, the vessel may be heated, for example, by being located in a suitable heated enclosure, such as an oven or a furnace. It may be desirable to have the valve outside that heated area so that it can be readily accessed by an operator and/or so that the valve does not itself get too hot.

Where the valve is located at a distance away from the vessel there is thus a significant length of conduit between the valve and the vessel. Material in the vessel may settle out from the vessel into said conduit. In addition, the longer the conduit, the more likely the conduit is to become blocked, which can cause problems with discharge of materials from the apparatus. This is particularly true where solids or slurries are present in a vessel, for example as reaction products, since such products are often difficult to remove from a vessel. There is a need for a stirring apparatus which overcomes or at least mitigates these problems.

U.S. Pat. No. 4,690,804 relates to catalytic reactions. In particular, U.S. Pat. No. 4,690,804 relates to a mixing tank for catalyst to be introduced into a reactor. The mixing tank has a cylindrical outlet conduit at the base of the tank, and an agitator on a shaft within the tank which terminates in a spiral configuration located within the outlet conduit. The agitator of U.S. Pat. No. 4,690,804 provides agitation within the conduit, preventing bridging of the outlet conduit as catalyst is passed through the conduit from the mixing tank and into a receiver (reaction) vessel below. However, there is no disclosure that the agitator of U.S. Pat. No. 4,690,804 is adapted to convey material within the conduit out of the mixing tank. In contrast, during feeding of catalyst from the mixing tank into the receiving vessel, the flow of catalyst is controlled by a ball-check feed valve, the agitator simply helping to prevent bridging. In addition, there is no disclosure that the agitator of U.S. Pat. No. 4,690,804 is adapted to convey material within the conduit into the mixing tank above.

SUMMARY OF THE INVENTION

The present invention provides a vessel having a conduit extending therefrom, which has an improved stirrer therein, said stirrer being adapted to convey material within the conduit in a direction towards the vessel and/or in a direction away from the vessel.

Thus, in a first aspect, the present invention provides an apparatus comprising a vessel having a conduit extending therefrom, and a stirrer, a section of which is adapted to be located within the conduit and a section of which is adapted to be located within the vessel, wherein said stirrer is adapted such that, in use, material contained within the conduit is conveyed in a direction towards the vessel.

In this aspect of the present invention, material within the conduit is conveyed in to the vessel by the action of the stirrer. For example, material being stirred in the vessel is thus prevented from settling in the conduit and is conveyed back into the vessel.

In a second aspect, the present invention provides an apparatus comprising a vessel having a conduit extending therefrom, and a stirrer, a section of which is adapted to be located within the conduit and a section of which is adapted to be located within the vessel, wherein said stirrer is adapted such that, in use, material contained within the conduit is conveyed through the conduit in a direction away from the vessel.

In this aspect of the present invention, material within the conduit is conveyed in a direction away from the vessel by the action of the stirrer. Hence, in this aspect, material may be conveyed out of the apparatus, facilitating discharge of said material.

In a preferred aspect of the present invention, the apparatus is such that material in the conduit may be conveyed, alternatively, in a direction towards the vessel or in a direction away from the vessel by the same stirrer.

Hence, in a third, preferred, aspect, the present invention provides an apparatus, comprising a vessel having a conduit extending therefrom, and a stirrer, a section of which is adapted to be located within the conduit and a section of which is adapted to be located within the vessel, wherein said stirrer is adapted such that, when rotated in a first direction, material contained within the conduit is conveyed in a direction towards the vessel, and when rotated in a second direction, material contained within the conduit is conveyed through the conduit in a direction away from the vessel.

Where the first direction is clockwise the second direction is anti-clockwise, and vice versa.

Preferably the conduit extends from the lowest point (base) of the vessel. This configuration allows the vessel to be completely emptied of material most readily.

The apparatus may also comprise a suitable stirrer drive. The suitable stirrer drive is any that is able to rotate the stirrer in the required direction. In the third aspect of the present invention, the stirrer drive must be able to rotate the stirrer in both the first direction and the second, opposite, direction i.e. any suitable bi-directional stirrer drive.

The stirrer may be connected to the stirrer drive by a suitable first coupling. The first coupling may be any suitable coupling that allows the stirrer to be connected to (and rotated by) the drive, preferably a coupling that allows the stirrer to be connected and disconnected from the drive.

At the end of the stirrer remote to the stirrer drive the stirrer preferably ends in a suitable tip, for example, with a flat, round or pointed end.

Preferably, the stirrer drive is located above the conduit and the stirrer is adapted to extend from said stirrer drive through the vessel and into the conduit. Hence, the tip of the stirrer is preferably located on the section of the stirrer adapted to be located within the conduit.

In a preferred embodiment, the stirrer may be defined by a first part adapted to be connected to a suitable stirrer drive, and comprising the section of the stirrer which is adapted to be located within the vessel, and a second part, adapted to be connected to said first part and comprising the section of the stirrer which is adapted to be located within the conduit, wherein said second part is adapted such that, in use, material contained within the conduit may be conveyed in a direction towards or in a direction away from the vessel as described herein.

In use the first part and the second part are connected together to form the stirrer. The connection of the first and second parts may be a fixed, permanent connection. For example, the stirrer could be formed as a single piece comprising said first and second parts or the stirrer could be formed of first and second parts which have been formed separately and then welded together. Optionally, the second part and the first part may be connected by a suitable second coupling that allows the parts to rotate together when connected, and also allows the second part to be disconnected from the first part.

Preferably, the section of the stirrer which is adapted to be located within the vessel is adapted to stir materials in the vessel when the stirrer is rotated. For example, the section of the stirrer which is adapted to be located within the vessel may comprise a shaft having one or more stirrer blades.

The shaft may have any suitable elongated shape or structure, for example, of cylindrical, square, hexagonal or similar cross-section, preferably cylindrical. The shaft may have a constant cross-section, for example, cylindrical and of constant diameter, or the shaft may have varying cross-section along its length, for example, varying diameter.

The one or more stirrer blades may comprise, for example, one or more paddle-type stirrers with two or more, for example 2 to 6 blades each, or one or more helical projections from the shaft. Where there are more than one such stirrers or projections, for example, they may be located at different positions on the shaft.

As used herein, the section of the stirrer which is adapted to be located within the conduit refers to the section of the stirrer that is located within the conduit when part of the apparatus according to the present invention.

Preferably, the section of the stirrer which is adapted to be located within the conduit comprises one or more flutes which describe a helical path about the rotational axis of the stirrer.

When the stirrer is rotated, these flutes cause material to be conveyed through the conduit (either in a direction towards the vessel or in a direction away from the vessel, depending on the direction of the flutes and the direction of rotation).

Preferably, the section of the stirrer which is adapted to be located within the conduit may comprise an elongate core, having one or more flutes. For example, the core may be of cylindrical, square, hexagonal or similar cross-section, preferably cylindrical. The core may be of constant cross-section, or the core may have varying cross-section along its length, for example, varying diameter.

In one embodiment, the section of the stirrer which is adapted to be located within the conduit may comprise a threaded structure similar to that seen on a screw or bolt.

In a preferred embodiment, the section of the stirrer which is adapted to be located within the conduit may comprise a structure similar to a drill-bit or screw extruder.

As described above, the section of the stirrer which is adapted to be located within the conduit preferably comprises one or more flutes which describe a helical path about the rotational axis of the stirrer. Where one or more flutes describe a helical path about the rotational axis of the stirrer this defines a "fluted section" of the stirrer. In one embodiment the fluted section may form only a part of the section which is adapted to be located within the conduit, but, preferably, the whole of the section which is adapted to be located within the conduit is fluted. In addition, the fluted section is not limited to the section which is adapted to be located within the conduit, and may, for example, extend from this section over sections of the stirrer not adapted to be located within the conduit.

The fluted section may be defined by one or more of the following parameters:

(i) direction of the one or more flutes

The one or more flutes may be one or more right-hand flutes, or, alternatively, one or more left-hand flutes. As used herein a right-hand flute means that the path of the flute, when viewed from the tip, is directed back from the tip in a clockwise direction. Conversely, the path of a left-hand flute, when viewed from the tip, is directed back from the tip in an anti-clockwise direction. A right-hand flute will move material along the flutes away from the tip when rotated in an anti-clockwise direction as viewed from the tip.

(ii) number of flutes

Preferably, the number of flutes around the core is one to four, more preferably one or two, and most preferably two. In general, for a fixed diameter fluted section, the larger the number of flutes then the smaller the width of each (see point (v) below). The one or more flutes will be separated by one or more lands (the solid parts between adjacent flutes). For example, there will be one land between adjacent turns of one flute, or two or more lands between two or more flutes.

(iii) helical angle of flutes

The helical angle of a flute, as defined herein, is the angle between the tangent to the flute, and a plane containing the axis of the fluted section. The flutes may be at any suitable helical angle. Typically the helical angle is between 20 and 70°, preferably between 30 and 60°, and more preferably between 40 and 50°.

(iv) number of turns of the flute

The number of turns that the flute makes will depend on the helical angle of the flute and the length of the fluted section. The flutes may make one complete turn or may make more than one complete turn around the rotational axis.

(v) flute and land width, and flute depth and cross-sectional shape

The width of a flute or land, as used herein, refers to the distance across the flute or land measured at a right angle to its edge. Wider and deeper flutes may be preferred for materials that comprise relatively large particles. Alternatively, smaller flutes may be preferred if they allow increased control of discharge of material from the vessel when the stirrer is rotated in the second direction. Most preferably, the flutes and lands are of similar width. The flutes may be of any suitable cross-sectional shape, such as semi-circular.

(vi) the effective diameter of the fluted section

The effective diameter of the fluted section is the diameter of the circle of maximum size described by the fluted section when the fluted section is rotated about its linear central axis. This is described further below.

(vii) tip (or point) angle

In a preferred embodiment, the tip of the stirrer is located on the section of the stirrer adapted to be located within the conduit. Most preferably, the tip forms part of the fluted section. The fluted section may therefore be further defined by the tip (or point) angle, which is the angle formed at the tip, as shown in FIG. 1. The tip angle is not critical to the present invention, but is typically between 60° and 180°.

Where the stirrer is defined by a first part and a second part as previously described, the second part of the stirrer preferably comprises the fluted section for at least the section adapted to be located within the conduit. More preferably the fluted section forms at least 80% of the length of the second part, and most preferably at least 90% of its length. The remainder of the second part, if any, preferably comprises one or more non-fluted sections, such as a shank or couplings.

Most preferably the second part comprises a single fluted section, which fluted section commences at the tip of the stirrer and forms at least 90% of the length of the second part. The non-fluted section, if any, of the second part, preferably comprises a shank part and may, optionally, also comprise a coupling for connection to the shaft of the first part.

The section of the stirrer which is adapted to be located within the conduit will have an effective diameter, D(l), at a particular distance (l) along the section. The effective diameter of the section, at a particular distance along the section, as used herein, is the diameter of the circle of maximum size described by the section at the distance, 1, when the stirrer is rotated about its linear central axis. With the exception of the tip (when part of this section), this section may be of constant effective diameter along its length (i.e. D(l) is constant), or the effective diameter may vary along its length. For example, the section of the stirrer which is adapted to be located within the conduit may be stepped or tapered along it length such that the effective diameter may get smaller moving along the length of the section.

The section of the stirrer which is adapted to be located within the conduit must have an effective diameter smaller than the minimum inner cross-section in the respective part of the conduit. By "respective part" of the conduit, as used herein, is meant the part of the conduit in which a particular part of the stirrer is located when in use. The conduit is preferably cylindrical, and hence, in this case, the section of the stirrer which is adapted to be located within the conduit must have an effective diameter smaller than the diameter of the respective part of the conduit.

The cylindrical conduit may be of constant inner diameter along its length or the inner diameter may vary along its length. For example, the inner diameter of the conduit may be stepped or may taper such that the inner diameter reduces with length away from the vessel. Preferably, the cylindrical conduit is of constant inner diameter along its length.

Where the conduit is of constant inner diameter then the effective diameter of the section of the stirrer which is adapted to be located within the conduit is preferably also of constant diameter. Where the conduit is of variable inner diameter along its length, then the effective diameter of the section of the stirrer which is adapted to be located within the conduit may vary correspondingly, for example, the section of the stirrer which is adapted to be located within the conduit may be tapered to fit within a tapered conduit.

Preferably, the section of the stirrer which is adapted to be located within the conduit is such that, in use within the conduit, the effective diameter of the portion at a location within the conduit is at least 50% of the inner diameter of the conduit at that location within the conduit, more preferably at least 60% and most preferably in the range 70-90%.

The apparatus according to the present invention may be of any suitable size.

However, although the apparatus according to the present invention will now be described with reference to a preferred size, the apparatus according to the present invention may readily be sized for use with both larger and smaller vessels.

Preferably the apparatus comprises a relatively small vessel, such as relatively small reaction vessels. Examples of suitable small reaction vessels include batch reactors, typically of volume from 1 ml to 5 litres, preferably of at least 10 ml in volume and/or up to 500 ml in volume.

Preferably the conduit is an outlet conduit, for example, for removal of material, such as reaction product, from the vessel.

The effective diameter at a particular length, D(l), of the section of the stirrer which is adapted to be located within the conduit, must be sized such as to allow the stirrer to fit in the conduit. For the vessel sizes described above, the effective diameter of the section of the stirrer which is adapted to be located within the conduit is preferably from 0.5 to 100 mm, preferably at least 2.5 mm and/or up to 20 mm. The present invention is particularly useful for vessels with relatively small conduit diameters, since these are most prone to blocking, and, hence, the effective diameter is especially less than 15 mm, more preferably less than 10 mm.

Correspondingly, the conduit may itself preferably have a diameter (or minimum diameter if not constant) of from greater than 1 to 101 mm, preferably at least 3 mm and/or up to 21 mm. The present invention is particularly useful for vessels with relatively small conduit diameters, especially less than 16 mm, more preferably less than 11 mm, since these are most prone to blocking. The preferred overall length of the stirrer will depend on the vessel size and the conduit length. For example, the stirrer may have a total length of between 20 and 300 mm, preferably at least 50 mm and/or up to 200 mm, especially for use in relatively small vessels, such as the batch reactors described above.

Preferably, the section of the stirrer which is adapted to be located within the conduit comprises one or more flutes which describe a helical path about the rotational axis of the stirrer, as described above. The one or more flutes may be of any suitable width. The preferred width of the flutes will be defined by the size, in particular the width, of the section of the stirrer which is adapted to be located within the conduit. For example, the flutes of the section of the stirrer which is adapted to be located within the conduit may have a width of between 0.2 and 15 mm, preferably at least 2 mm and/or up to 10 mm, especially for use in relatively small vessels, such as the batch reactors described above. The one or more flutes will preferably have a helical angle of between 20 and 70°, preferably between 40 and 50°. Preferably the fluted section comprises two flutes (separated by two lands).

Preferably the stirrer comprises a first and a second part as described above. The first part and the second part may each be of any suitable individual length. The preferred length of the first part will be defined by the size of the vessel, whereas the preferred length of the second part will be defined, at least in part, by the length of the conduit. For example, the first and second parts of the stirrer may each, independently, have a length of between 10 and 200 mm, preferably at least 25 mm and/or up to 120 mm each, especially for use in relatively small vessels, such as the batch reactors described above.

The stirred apparatus according to the present invention may be used for stirring one or more materials in a vessel.

Hence, in a fourth aspect, the present invention also provides a method of stirring one or more materials in an apparatus, which method comprises-using an apparatus as described above.

Preferably the method of stirring one or more materials in an apparatus, comprises:

(a) providing an apparatus, comprising a vessel, a conduit and a stirrer, as previously described, (b) providing one or more materials in the vessel, and (c) stirring said one or more materials using the stirrer.

Most preferably the method according to the present invention may be used for stirring one or more materials in a vessel wherein the conduit has a constant inner diameter. The stirrer may then also have a section which is adapted to be located within the conduit of constant effective diameter along its length. The conduit is preferably a tube of cylindrical inner diameter, at the base of which is a conduit valve, which allows the bottom of the conduit to be sealed.

The vessel may be used for stirring any suitable material, such as solids, liquids, slurries and suspensions.

The method of the fourth aspect of the present invention has particular advantages when used to stir solids or mixtures comprising solids, but may also be advantageously used with other materials that may cause problems with, for example, material settling in the conduit and/or with the conduit blocking.

In the method of the fourth aspect present invention, to stir the material or materials in the vessel, and with the conduit valve closed, the stirrer is configured to turn in a suitable direction such that the stirrer stirs the materials in the vessel, whilst the section of the stirrer which is adapted to be located within the conduit rotates such that material that may fall into the conduit is conveyed back in to the vessel. This has the advantage that material does not settle in the conduit. For example, for materials which it is desired to keep stirring to prevent them from solidifying or separating, the stirrer prevents material accumulating in the conduit by continually conveying it back in to the stirred area of the vessel. In particular, for chemical reactions utilising a solid catalyst where the vessel comprises a stirred reaction zone, the stirrer prevents the catalyst settling in the conduit and hence keeps more of the catalyst in the stirred reaction zone.

When it is desired to remove material from the vessel, such as materials comprising catalyst and/or solid product from a reaction vessel, then the direction of the stirrer may be reversed and the conduit valve opened. The section of the stirrer which is adapted to be located within the conduit then acts to convey material out of the vessel through the conduit. Preferably the conduit extends from the lowest point (base) of the vessel. The stirrer has the advantage that material is removed from the apparatus without blocking of the conduit.

In addition, by selection of suitable relative sizes of the stirrer and conduit, to prevent material bypassing the stirrer within the conduit, it is also possible to remove certain materials, such as thick or viscous slurries or "sticky" solids, at controlled rates by varying the speed at which the stirrer is rotated. Suitable materials include any that only exit the conduit at the rate of turning of the stirrer. This allows defined amounts of material to be removed without use of other rate controlling means, such as ball-check feed valves.

The invention is particularly useful for polymerisation reactions, such as fluidised bed polymerisation of ethylene or propylene, or co-polymerisation of ethylene or propylene with each other or with other suitable monomers. The stirrer prevents non-fluidised material settling in the reactor conduit.

When used for reactions, such as polymerisation reactions, where solids are produced, the flute width of the fluted section of the stirrer is preferably selected such that the solid material is conveyed out of the vessel and through the reactor conduit without significant grinding. In particular, for polymer products the flute width is selected such that the polymer retains its morphology when discharged from the vessel. Hence, for a polymer product with a particle size of, for example, up to 2.5 mm, the flute width is preferably at least 5 mm, such as 5 to 10 mm.

The invention is also particularly useful in high throughput experimentation. The introduction of high throughput chemistry techniques, and in particular the growing use of robots and computers to automate catalyst and materials preparation and testing, has allowed researchers to potentially test tens to hundreds to thousands or more catalysts and materials than previously possible. Much effort has gone in to developing preparation and testing apparatus for numerous types of materials and material properties (for example U.S. Pat. No. 5,776,359) and, in particular, for chemical reactions of interest (for example see U.S. Pat. No. 5,959,297, U.S. Pat. No. 6,063,633 and U.S. Pat. No. 6,306,658). However, as the number of experiments it may be possible to run has increased, so the bottlenecks in catalyst testing have shifted. For example, where a researcher had previously to only make, load and test a few catalysts a day or even in a week, the researcher now has to make a much larger number of catalysts to perform the tests on. In addition, the scale (i.e. volume of catalyst tested) on which high throughput experiments are run has generally decreased inversely to the increase in number of parallel experiments. Further, whereas "conventional" catalyst testing often involves fairly lengthy reaction times, for example, several hours or longer, it is also desirable to identify potential catalyst candidates more rapidly. Hence, many high throughput techniques look to rapidly "screen" potential catalysts for activity by running faster experiments to determine catalysts worthy of more detailed analysis. These problems have been addressed to some extent by the use of various robotic techniques and/or other automation to prepare and load catalysts, and to operate catalyst testing apparatus.

As stated above the present invention is particularly useful for high throughput experimentation. In particular, with the reduction in scale of experimentation, the quantities of catalyst used have decreased. Since the overall quantities of catalyst used are relatively low, the use of apparatus according to the present invention wherein, for example, catalyst in the vessel is prevented from settling in the conduit, can make significant differences to the measured activity, and, potentially, to the reproducibility of high throughput testing.

In addition, use of the apparatus according to the present invention, which, for example, facilitates the discharge from the apparatus of the products of a reaction, allows the experimental process, including discharge, to be readily automated. Reliable discharge also means that an operator is not required to check each reactor vessel between experiments, for example, the operator is not required to check each vessel for blockages. This allows further increases in throughput. This is particularly true where solids or slurries are present in a reaction since such products are often difficult to remove from a reactor vessel.

Hence, the present invention is particularly useful when used in a series of parallel vessels, such as in a high throughput system comprising 4 or more vessels, especially reaction vessels, since it facilitates improved removal of material from each vessel, and hence allows increased automation of the apparatus.

Hence, in further aspect of the present invention, there is provided a high throughput system comprising 4 or more apparatuses according to the present invention.

The high throughput system preferably comprises 8 or more apparatuses according to the present invention. Each vessel in the high throughput system will typically will be at least 1 ml, preferably at least 10 ml, in volume and/or up to 500 ml in volume.

In a further aspect, the present invention also provides a stirrer, comprising first and second parts as herein described.

BRIEF DESCRIPTION OF THE DRAWINGS

The invention will now be illustrated by way of example only and by reference to FIGS. 1 to 3.

EXAMPLES

Example 1

Figure 1:
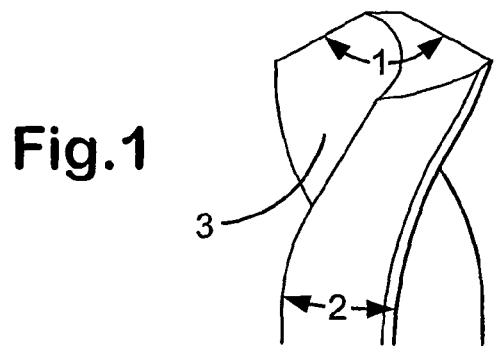
FIG. 1 represents schematically the tip of a stirrer according to the process of the present invention, showing the tip angle, 1, a land, 2, and flute, 3.
Figure 2:
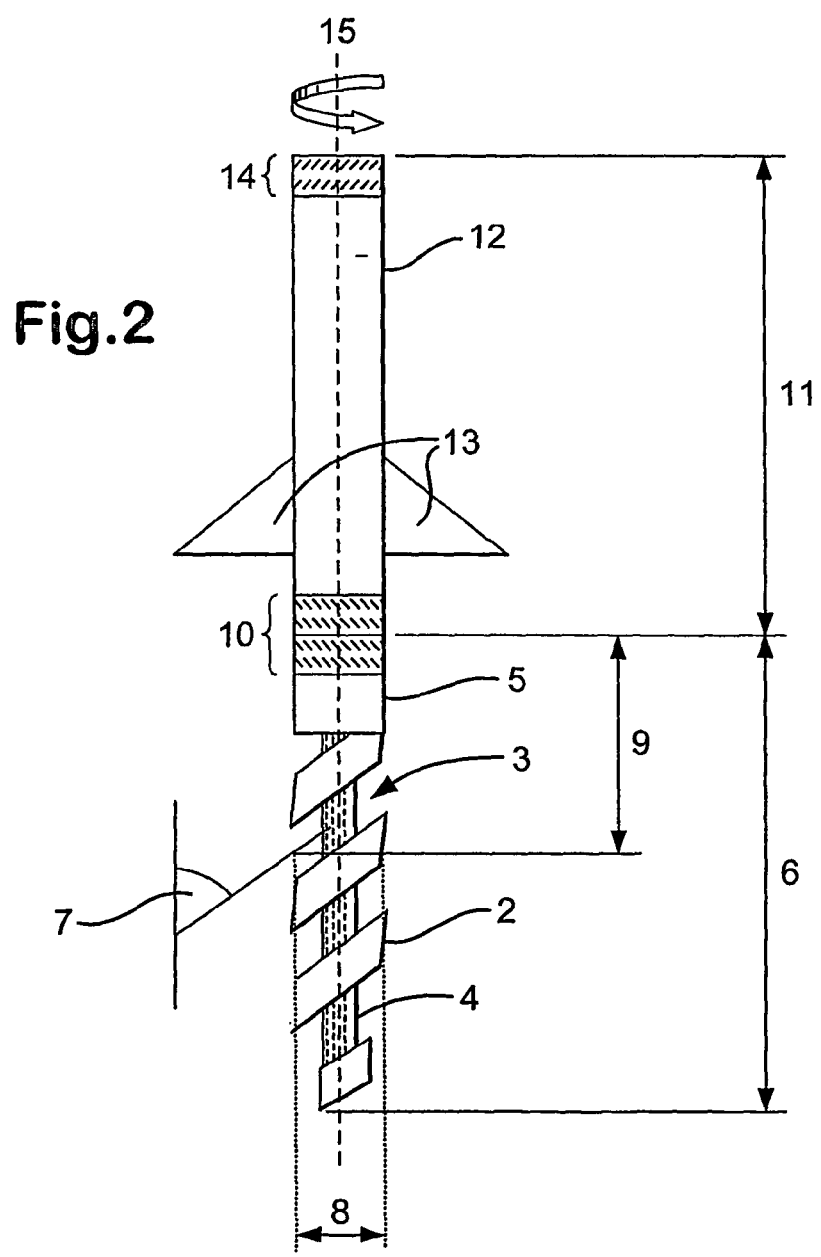
FIG. 2 represents schematically a stirrer according to a preferred aspect of the present invention. The stirrer of FIG. 2 shows a land, 2, a flute, 3, a core, 4, and a shank, 5, which form the second part, 6, of the stirrer. The second part, 6, has a helical angle, 7, as shown, and an effective diameter (D(l)), 8, at a distance l along the second part (shown by 9). The second part is connected, via an optional second coupling, 10, to the first part, 11, which first part comprises a shaft, 12, stirring blades, 13, and a first coupling 14, that allows the stirrer to be connected to a stirrer drive. In use, the stirrer rotates about the rotational axis, 15.
Figure 3:
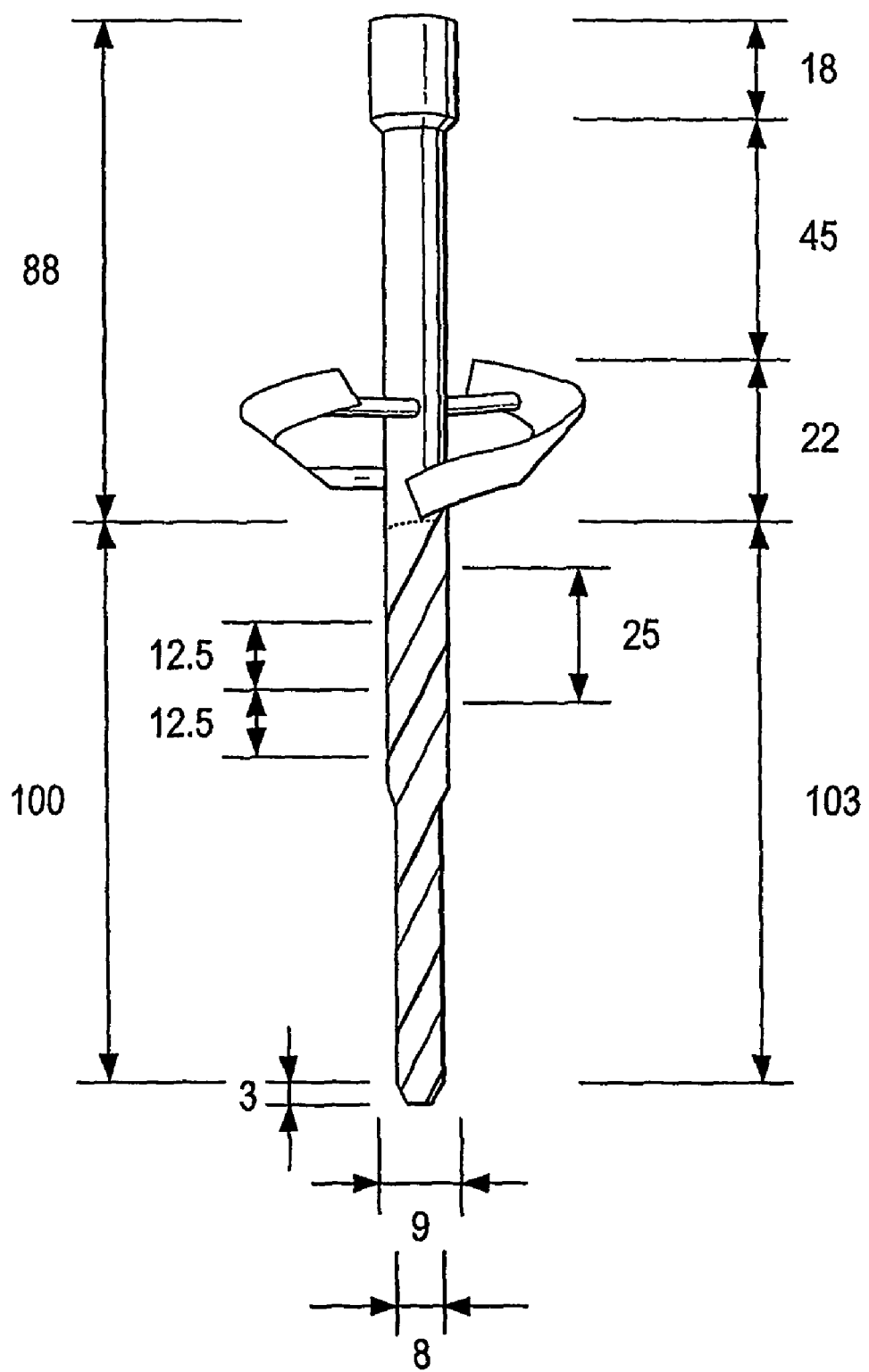
FIG. 3, represents a preferred stirrer, and includes preferred dimensions (in mm), for use in high throughput experimentation, especially reactions in autoclaves such as batch polymerisation.

The stirrer shown in FIG. 3 was used in a batch polypropylene experiment. 60 g of seed bed (sodium chloride) was used as the fluidisation medium in a 270 ml autoclave vessel using a stirrer as shown in FIG. 2. The autoclave had a cylindrical outlet conduit that was approximately 100 mm long with a valve at its base. The outlet conduit had an internal diameter of approximately 10 mm at its top, which reduced to approximately 8 mm at the valve. The flute width was approximately 9 mm. After injection of the catalyst and addition of propylene gas, polymer was formed. 40 g of particulate polypropylene was made during an 80 minute test. During this time the stirrer was turning at 400 rpm in a clockwise direction.

At the end of the test the gaseous contents of the reactor were vented, the reactor was cooled to 45° C. and 100 ml of heptane was added to the autoclave. The reactor was pressurised to 0.3 bar using nitrogen and the stirrer was then turned in an anticlockwise direction at 400 rpm. After 10 s the bottom valve of the autoclave was opened with the stirrer still turning anticlockwise.

All particulate matter was removed from the reactor. This was confirmed in two steps. Firstly, a further washing to remove any additional polymer or seed bed retained in autoclave showed no additional polymer or seed bed. Removal of the autoclave and visual inspection confirmed that no polymer or seed bed were present in the autoclave. The polymer produced comprised particles of up to 2.5 mm diameter. The particles were observed to have good morphology, and no evidence of grinding of the polymer particles with the seed bed material during discharge was observed.

Comparative Example A 60 g of seed bed (sodium chloride) was used as the fluidisation medium in a 270 ml autoclave vessel as in Example 1, but using an apparatus/stirrer not according to the present invention. The stirrer consisted of the same first part as in Example 1, but without a second part. After injection of the catalyst and addition of propylene gas, polymer was formed. 28 g of particulate polypropylene was made during an 80 minute test. During this time the stirrer was turning at 400 rpm in a clockwise direction.

At the end of the test the gaseous contents of the reactor were vented, the reactor was cooled to 45° C. and 100 ml of heptane was added to the autoclave. The reactor was pressurised to 0.3 bar using nitrogen and the stirrer was then turned in an anticlockwise direction at 400 rpm. After 10 s the bottom valve of the autoclave was opened with the stirrer still turning anticlockwise.

Only 2 g of seed bed fell out of the reactor. Removal of the autoclave confirmed that the majority of the seed bed and polymer had remained in the reactor.

The invention claimed is:

1. A method of stirring one or more materials in an apparatus, which method comprises:
   (i) providing an apparatus comprising a vessel having a conduit extending therefrom, which conduit is a tube of cylindrical inner diameter at the base of which is a conduit valve which allows the bottom of the conduit to be sealed, and a stirrer, a section of which is adapted to be located within the conduit and a section of which is adapted to be located within the vessel, wherein said stirrer is adapted such that, when rotated in a first direction, material contained within the conduit is conveyed in a direction towards the vessel, and when rotated in a second direction, material contained within the conduit is conveyed through the conduit in a direction away from the vessel,
   (ii) providing one or more materials in the vessel,
   (iii) stirring said one or more materials using the stirrer, wherein with the conduit valve closed, the stirrer is configured to turn in the first direction such that the stirrer stirs the materials in the vessel, whilst the section of the stirrer which is adapted to be located within the conduit rotates such that material that may fall into the conduit is conveyed back in to the vessel, and
   (iv) reversing the direction of the stirrer and opening the conduit valve when it is desired to remove material from the vessel.

2. A method according to claim 1 wherein the vessel is a batch reactor of from 1 ml and up to 500 ml in volume.

\* \* \* \* \*